US005097186A

United States Patent [19]

Kokubu

[11] Patent Number: 5,097,186

[45] Date of Patent: Mar. 17, 1992

[54] APPARATUS FOR CONTROLLING POWER WINDOW REGULATOR

[75] Inventor: Sadao Kokubu, Aichi, Japan

[73] Assignee: Kabushiki Kaisha Tokai-Rika-Denki-Seisakusho, Aichi, Japan

[21] Appl. No.: 584,785

[22] Filed: Sep. 19, 1990

[30] Foreign Application Priority Data

Sep. 27, 1989 [JP] Japan ................................ 1-113028

[51] Int. Cl.[5] ............................................ H02P 3/00

[52] U.S. Cl. .................................... 318/280; 318/266

[58] Field of Search ............................... 318/280–286, 318/264–266, 272, 275, 650, 652, 625, 626, 563, 568.24, 632, 374, 369, 466–470; 49/26, 28, 118, 138, 199, 264, 280, 324; 160/3, 291, 293.1

[56] References Cited

U.S. PATENT DOCUMENTS

| | | | |
|---|---|---|---|
| 3,675,101 | 7/1972 | Robbins | 318/266 |
| 3,733,532 | 5/1973 | Hill | 318/266 |
| 4,138,630 | 2/1979 | Graham | 318/257 |
| 4,338,552 | 7/1982 | Pilz et al. | 318/266 |
| 4,364,003 | 12/1982 | Phipps | 318/468 X |
| 4,476,416 | 10/1984 | Licata et al. | 318/286 X |
| 4,562,387 | 12/1985 | Lehnhoff | 318/285 |
| 4,628,234 | 12/1986 | Mizuta et al. | 318/286 X |
| 4,678,975 | 7/1987 | Vrabel et al. | |
| 4,730,152 | 3/1988 | Foust et al. | 318/266 X |

*Primary Examiner*—William M. Shoop, Jr.
*Assistant Examiner*—A. Jonathan Wysocki
*Attorney, Agent, or Firm*—Sixbey, Friedman, Leedom & Ferguson

[57] ABSTRACT

An apparatus for controlling a window regulator connecting semiconductor switching elements which are turned ON or OFF depending on the ON-OFF state of operation switches and relay coils which are energized or de-energized depending on the ON-OFF stage of semiconductor switching elements connected to a power source through the operation switches. When the operation switches are OFF, a voltage is never applied to the semiconductor switching elements and therefore there is no fear of malfunction of semiconductor switching elements due to noise.

17 Claims, 1 Drawing Sheet

APPARATUS FOR CONTROLLING POWER WINDOW REGULATOR

BACKGROUND OF THE INVENTION

1. Field of the Invention

The present invention relates to an apparatus for controlling a power window regulator for opening and closing a window with a motor.

2. Description of the Related Art

In a control apparatus for a power window regulator to be used for a vehicle, the power is usually supplied through relays to a motor for vertically moving a window glass. In this case, such a relay is controlled by a semiconductor switching element which is turned ON and OFF by an operation switch operated externally. Since such a semiconductor switching element can easily be controlled to switch ON and OFF, it is used for drive control of the relays. The operation of resetting the power supply connected to a motor can also be executed by such a semiconductor switching element.

In the conventional control apparatus for a power window regulator, a semiconductor switching element and a relay coil of a relay are connected in series to the power source and, therefore, the power supply voltage is supplied to the series circuit of the semiconductor switching element and relay coil even when an operation is in the OFF state. However, in such a condition, if a noise is applied to the power supply line or the signal line for ON-OFF control of the semiconductor switching element, the semiconductor switching element typically malfunctions resulting in malfunction of the motor. This problem has lowered the reliability of control of such power window regulators.

SUMMARY OF THE INVENTION

The present invention has been proposed considering such background and therefore it is an object of the present invention to provide an apparatus for controlling a power window regulator which suppresses malfunction of the switching element and realizes improvement in reliability of control even with a structure utilizing a semiconductor switching element as a control element.

In order to attain this object, the present invention connects to a power supply through an operation switch, a semiconductor switching element which turns ON when the operation switch is turned ON and a relay coil which is actuated when the semiconductor switching element is turned ON. Moreover, the present invention also provides a motor for moving a window glass in any one direction of the closing and opening directions depending on the direction thereof of current supplied, and a relay switch for changing the direction of current supplied to the motor by switching in response to energization and de-energization of the relay coil.

When the operation switch is turned ON, the semiconductor switching element is also turned ON. Therefore, power is supplied to the relay coil through the operation switch, and the motor is thereby rotated to drive the window glass.

Since the semiconductor switching element is connected with the power source through the operation switch, when the operation switch is in the OFF state, the power source voltage is never supplied to the semiconductor switching element and therefore there is no fear of the semiconductor switching element malfunctioning due to noise.

As is apparent from the above explanation, the present invention has a structure in which the operation switch is provided between the semiconductor switching element which drive the relay coil for supplying power to the motor and the power source and therefore provides the practical effect that the power source voltage is never supplied to the semiconductor switching element when the operation switch is in the OFF state and therefore the semiconductor switching element will never malfunction due to noise elements.

DESCRIPTION OF THE PREFERRED EMBODIMENT

Figure 1:
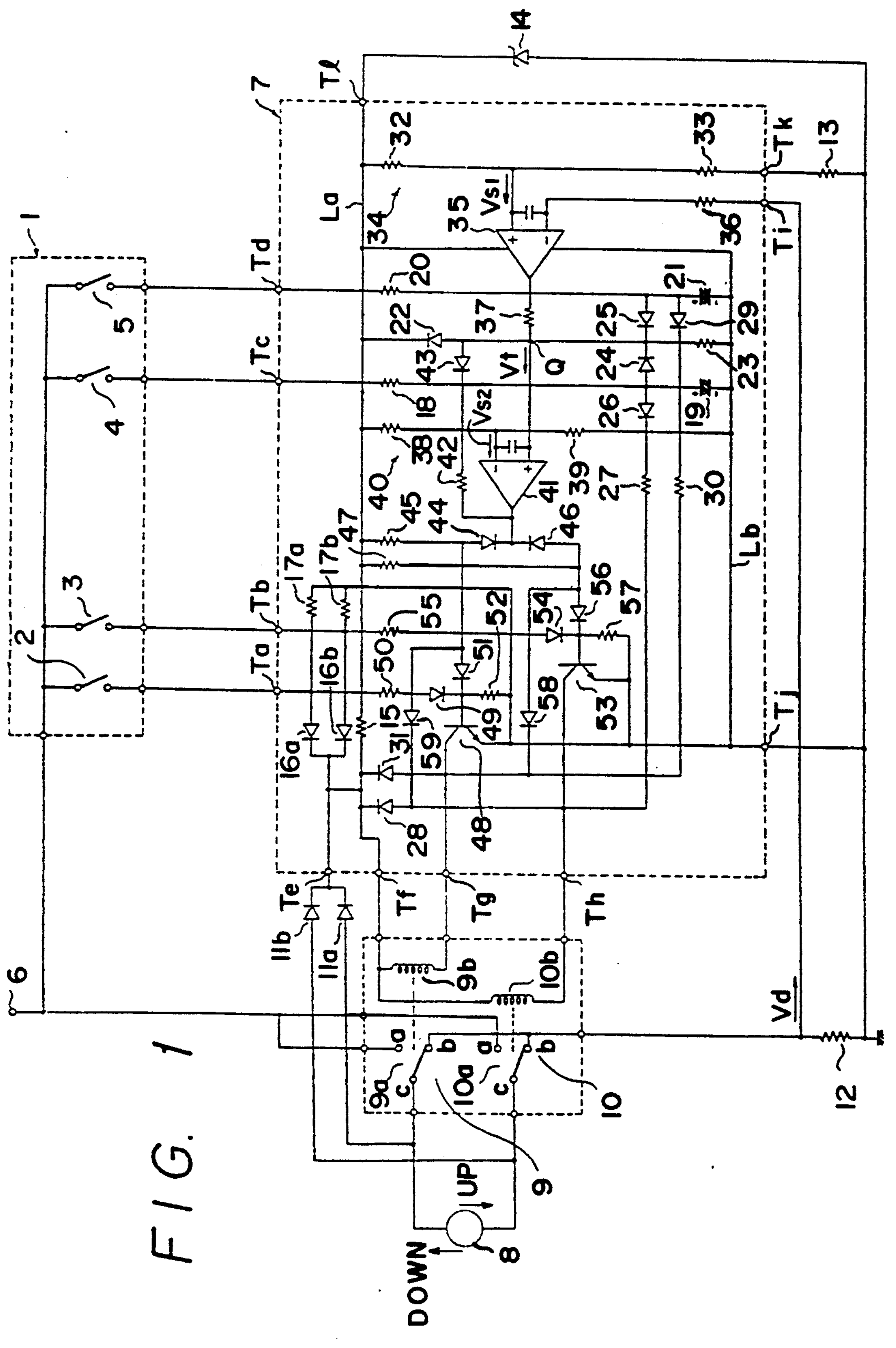
FIG. 1 is a wiring diagram indicating an electrical structural of a preferred embodiment of the present invention

A preferred embodiment in which the present invention is applied to a power window regulator for the driver's seat side of vehicle.

In the figure, a power window switch 1 provided in a position enabling operation from the driver's seat of a vehicle comprises a manual up-switch 2 as the first operation switch, a manual down-switch 3 as the second operation switch, an auto up-switch 4 and an auto down-switch 5, in addition to an operation knob (not illustrated) which may be operated by moving it, for example, in the front and rear directions from the neutral position. These switches 2-5 are constituted by automatic reset switches which automatically reset them to neutral positions. Each switch 2-5 is in the OFF state when the operation knob is in the neutral position, namely in a nonoperative condition. When the operation knob is moved from the nonoperative condition, a predetermined extent in the forward direction the manual up-switch 2 is turned ON, and when the operation knob is further moved in the forward direction from this ON state, the automatic up-switch 4 is also turned ON. Moreover, when the operation knob is moved from the nonoperative condition a predetermined extent in the backward direction, a manual down-switch 3 is turned ON, and when the operation knob is further operated in the backward direction from this ON state, the auto down-switch 5 is also turned ON.

The first terminals of each of these switches 2-5 are connected to a DC power source terminal 6 as the power supply, while the other terminals are connected to the terminals Ta, Tb, Tc, Td of a control circuit 7. Although not illustrated in the figure, the DC power source terminal 6 is connected to a vehicle battery (output voltage is 12 V) through an ignition switch.

A DC motor 8 for driving a window regulator moves, in the upward direction (closing direction), a window glass of the door on the driver's side (not illustrated) when the power is supplied in the positive direction (arrow mark UP direction in the figure) and also moves the said window glass in the downward direction (opening direction) when the power is supplied in the reverse direction (arrow mark DOWN direction).

The first and second relays 9 and 10 are formed as a unit and movable contact c of relay switch 9*a* is connected to one end of motor 8 and movable contact c of the relay switch 10*a* to the other end of motor 8. The movable contacts c of the relay switches 9*a*, 10*a* are, moreover, connected to the terminal Te of the control circuit 7 through diodes, 11*a*, 11*b*. In the relay switches 9*a* and 10*a*, the normally-open contact (a) is connected to the DC power supply terminal 6, while the resting-closed contact b is connected to the ground terminal through a current detection resistor 12 for detecting a current flowing into the motor 8. The relay coil 9*b* of the first relay 9 is connected across terminals Tf, Tg of the control circuit 7 and the relay coil 10*b* of the second relay 10 is connected across terminals Tf, Th thereof.

Here, a detected voltage Vd of a voltage level depending on a load current flowing into the motor 8 appears at a terminal on the side of relays 9, 10 of the current detecting resistor 12, and this detected voltage Vd is applied to terminal Ti of the control circuit 7.

The control circuit 7 is formed by a hybrid IC having the terminals $T_j$-$T_l$ in addition to the terminals $T_a$-$T_i$ explained above. The terminal $T_j$ is connected to the ground terminal, the terminal $T_k$ to the ground terminal through a resistor 13 for generating a reference voltage $V_{s1}$ described later and the terminal $T_l$ the ground terminal through a constant voltage diode 14 (for example, Zener voltage 9V) of the polarity indicated in the figure.

Next, a concrete embodiment of the control circuit 7 will be explained hereunder.

The terminals $T_l$ and $T_j$ are respectively connected to a bus $L_a$ and an extra bus $L_b$. The bus $L_a$ is connected to the terminals $T_e$ and $T_f$ through a protection resistor 15 of a constant voltage diode 14. The terminal $T_a$ connected to the manual up-switch 2 is connected with the terminals $T_e$ and $T_f$ through a diode $16_a$ and also connected with the terminal $T_j$ through a resistor $17_a$. The terminal $T_b$ connected with the manual down-switch 3 is connected with the terminals $T_e$ and $T_f$ through a diode $16_b$ and is also connected with the terminal $T_j$ through a resistor 17*b*. The terminal $T_c$ connected with the auto up-switch 4 is connected with the extra bus $L_b$ through a series circuit connecting in series a resistor 18 and a capacitor 19 as a timer element. The terminal $T_d$ connected with the auto down-switch 4 is connected with the extra bus $L_b$ through a series circuit connecting in series a resistor 20 and a capacitor 21 as a timer element.

A series circuit comprised of a diode 22 for positive clamp with the polarity indicated in the figure and a discharge resistor 23 is connected between the bus $L_a$ and extra bus $L_b$. The discharge resistor 23 is provided in the series circuit for discharging the capacitors 19 and 21. The positive terminal of capacitor 19 is connected with one end of the discharge resistor 23 through a diode 24, while the positive terminal of capacitor 21 is connected to one end of discharge resistor 23 through a diode 25. In this case, the capacities of capacitors 19 and 21 are set equal, and the time constant of resistor 18 and capacitor 19 taken together is also st equal to the time constant of resistor 20 and capacitor 21 taken together, for example, to about 0.01 second, and the time constants of discharge resistor 23 and, capacitor 19 taken together, and that of the same resistor 23 and capacitor 21 taken together, are both set, for example, to about 10 seconds. This discharge time constant is longer than the time required for the window glass to move from its open position to its closed position or the time required for the reverse action of the window glass.

The positive terminal of capacitor 19 is connected to the terminals $T_e$, $T_f$ through a forward diode 26, a resistor 27 and a forward diode 28 which also operates as a flywheel, and the positive terminal of capacitor 21 is connected to the terminals $T_e$, $T_f$ through a forward diode 29, a resistor 30 and a forward diode 31 which also operates as a flywheel.

A series circuit of resistors 23, 33 is connected between the bus $L_a$ and terminal $T_k$, a first reference voltage generating circuit 34 is constituted by these resistors 32, 33 and the resistor 13, enabling the reference voltage $V_{s1}$ to be output from the connecting point of the resistors 32 and 33.

A first comparison circuit 35 powered by the bus $L_a$ and extra but $L_b$ together with the current detection resistor 12 and first reference voltage generating circuit 34 constitute a well known auto stop circuit in the power window regulator and this auto-stop circuit also serves to compare the reference voltage $V_{s1}$ with a detected voltage $V_d$ given from the terminal $T_i$ through a resistor 36. The first compression circuit 35 outputs a high level signal (corresponding to the voltage of bus $L_a$) when $V_{s1} > V_d$ and inverts the output to the low level signal (corresponding to the voltage of extra bus $L_b$) when $V_{s1} \leqq V_d$.

An output terminal of the first comparison circuit 35 is connected to connecting point Q of the diode 22 and discharge resistor 23 through a resistor 37. As a result of such connections, when the comparison circuit 35 provides a low level signal output, a discharge current from the capacitor 19 and 21 flows through the diode 24 or 25 (in this instance, a discharge current also flows into the discharge resistor) and the discharge time constant is set, in this case, to about 0.7 second.

A second reference voltage generating circuit 40 consisting of a series circuit of resistors 38, 39 is connected between the bus $L_a$ and extra bus $L_b$ so that a reference voltage $V_{s2}$ can be output from the connecting point of the resistors 38 and 39.

A second comparison circuit 41 is connected so that it is powered, (not illustrated) from the bus $L_a$ and extra bus $L_b$. The second comparison circuit 41 is connected so as to compare the reference voltage $V_{s2}$ with the voltage ($V_t$) of point Q in the figure (connecting point of the diode 22 and discharge capacitor 23). Based on the comparison, it outputs a high level signal (corresponding to the voltage of bus $L_a$) when $V_{s2} < V_t$, or a low level signal (corresponding to the voltage of extra bus $L_b$) when $V_{s2} \geqq V_t$. In this case, a series circuit comprised of a resistor 42 and diode 43 of the polarity shown in the figure is connected between the output terminal and noninversion input terminal (connected to the point Q) and thereby the above comparison operation is given a hysteresis effect.

Moreover, a series circuit for preventing backward flow of current comprised of diode 44 with the polarity shown in the figure and a resistor 45 and a series circuit of a diode 46 in the polarity shown in the figure for preventing backward flow of current and a resistor 47 are connected between the output terminal of second comparison circuit 41 and the bus $L_a$.

An npn type transistor 48 as a first semiconductor switching element is connected, through the collector and emitter thereof, with the terminals $T_g$ and $T_j$ respectively. Thereby, the one end of relay coil $9_b$ of the first relay 9 is connected to the DC power source terminal 6 through the manual up-switch 2 and diode $16_a$, while the other end of relay coil $9_b$ is connected to the ground terminal through a transistor 48. The base of transistor 48 is connected to the terminal $T_a$ through a series circuit compressed of the diode 49 with the polarity shown in the figure and the resistor 50, and also connected to the anode of diode 44 through the diode 51 with the polarity shown in the figure. Moreover, a resistor 52 is connected between the base and emitter of transistor 48.

An npn type transistor 53 as a second semiconductor switching element is connected, through the collector and emitter thereof, to the terminals $T_h$ and $T_j$, respectively Thereby, the one end of relay coil $10_b$ of second relay 10 is connected to the DC power source terminal 6 through the manual down-switch 3 and diode $16_b$, while the other end of relay coil $10_b$ is connected to the ground terminal through the transistor 53. The base of transistor 53 is connected in the terminal $T_b$ through a series circuit comprised of the diode 54 in the polarity shown in the figure and resistor 55 and is also connected to the anode of diode 46 through the diode 56 with the polarity shown in the figure. Moreover a resistor 57 is connected between the base and emitter of transistor 53.

A diode 568 is connected, with the polarity shown in the figure, between the collector of transistor 48 and a diode 56, while a diode 59 is connected, with the polarity shown in the figure, between the collector of transistor 53 and a diode 51. These diodes 51, 56, 58, 59 form an interlocking circuit.

The operation of this structure is explained hereunder.

(A) When a window glass is operated vertically in the manual mode:

The manual up-switch 2 is turned ON for upward movement of the window glass. Thereby, a base current is applied to the transistor 48 from the DC power source terminal 6 through the manual up-switch 2, resistor 50 and diode 49 and the transistor 48 is activated. Simultaneously, a closed loop consisting of manual up-switch 2, diode 16*a*, relay coil 9*b* and transistor 48 is formed and power is supplied to this closed loop. Therefore, the relay coil 9*b* is activated, turning ON the contacts (c-a) of the relay switch 9*a*. As a result, a current flows to the motor 8 in the direction indicated by the arrow mark UP and thereby the window glass moves upward. If the manual up-switch 2 is turned OFF during the upward movement of the window glass, the relay coil 9*b* is demagnetized and the contacts (c-b) of relay switch 9*a* are returned to the position ON and thereby the current to the motor 8 is turned OFF and the upward movement of the window glass is stopped. Of course, the transistor 48 is turned OFF.

When the manual down-switch 3 is turned ON, the transistor 53 is also turned ON, magnetizing the relay coil 10*b* of second relay 10 and thereby the contact (c-a) of relay switch 10*a* are turned ON. Therefore, a current in the DOWN direction flows to the motor 8 and the window glass moves downward. During such downward movement of the window glass, if the manual down-switch 3 is turned OFF, the contacts (c-b) of relay switch 10*a* a are reset to the ON state, suspending the supply of current to the motor 8. Accordingly, the downward movement of the window glass is stopped and the transistor 53 is turned OFF.

(B) When the window glass is moved upward in the auto mode:

When the auto up-switch 4 is turned ON since the manual up-switch 2 is already turned ON at this point power is supplied to the relay coil $9_b$ and the motor 8 is driven because the transistor 48 is ON and the contact (c-a) of relay switch 9*a* are ON as explained in (A). Therefore, the window glass starts to move upward in response to this condition. In this condition, the DC power source terminal 6 is connected to the ground terminal through the contacts (c-a), diode 11*a*, resistor 15, bus $L_a$ and constant voltage diode 14. Accordingly, a DC constant voltage is supplied across the bus $L_a$ and extra bus $L_b$ and thereby the power source voltage of control circuit 7 is sustained.

However, when the auto up-switch 4 is turned ON, the capacitor 19 becomes charged within a short period (actually, about 0.01 seconds)s through a resistor 18. Thereby, the voltage $V_t$ at the point Q becomes higher than the reference voltage $V_{s2}$ sent from the second reference voltage generating circuit 40 and an output of the second comparison circuit 41 is converted to a high level signal. In the condition in which the output is converted, a base current is supplied from the bus $L_a$ to the transistor 48 through the resistor 45 and diode 51 and the ON state is sustained. The condition when the transistor 48 is ON is maintained until the output of second comparison circuit 41 is converted, namely throughout the time required for the voltage $V_t$ of the point Q to become lower than the reference voltage $V_{s2}$ (=about 10 seconds) due to discharge of capacitor 19 through the discharge resistor 23, or throughout the time required for the voltage $V_t$ to become lower than the voltage $V_{s2}$ by discharge triggered by the first comparison circuit 35. In the condition in which the transistor 48 is turned ON, a closed loop is formed by the contacts (c-a) of relay switch $9_a$, diode $11_a$, relay coil $9_b$ and transistor 48. Thereafter, even when the auto up-switch 4 and manual up-switch 2 are turned OFF, the relay coil $9_b$ is continuously magnetized and the motor 8 is also continuously driven, thereby realizing the automatic upward movement of the window glass.

As explained above, when the window glass automatically moves upward and reaches the maximum moving position (window closed position), the rotor in the motor 8 is locked and a comparatively large locked-rotor current flows into the motor and thereby the voltage drop across current detecting resistor 12 increases. With such increase of voltage drop, the detected voltage $V_d$ to be applied to the terminal $T_i$ increases and when the detected voltage $V_d$ becomes larger than the reference voltage $V_{s1}$ from the first reference voltage generating circuit 34, the output of the first comparison circuit 35 is converted to a low level signal (potential level of extra bus $L_b$). Thereby, the capacitor 19 is discharged for a period of about 0.7 second through the diode 24 and resistor 37 and the voltage $V_t$ of point Q becomes lower than the reference voltage from the second reference voltage generating circuit 41. As a result, the output of the second comparison circuit 41 is converted to a low level signal, turning OFF the transistor 48. Therefore relay coil $9_b$ is demagnetized and contacts (c-b) of relay switch $9_a$ are reset to ON. Accordingly the power to the motor 8 is turned OFF and the window glass stops at the maximum movement position. Then, the capacitor 19 is discharged over a period of about 0.7 seconds, and as a result, the window glass is moved upward by an additional increment.

When a locked-rotor current flows to the motor 8, the amount of current is sometimes decreased due to a rise in coil temperature. Therefore, when the motor 8 is driven in the automatic mode as explained above, the detected voltage $V_d$ sometimes does not exceed the reference voltage $V_{s1}$. In this case, an irregular event of power being needlessly applied to the motor 8 will occur on some occasions. In this case, the coil of motor 8 may generate irregular heat and the motor may generate burning of the coil. However, in the preferred embodiment of the present invention, the capacitor 19 is charged after the auto up-switch 4 is turned OFF and when the time T preset for the discharge circuit consisting of the capacitor 19 and discharge resistor 23 has passed, the voltage $V_t$ of point Q becomes lower than the reference voltage$_{s1}$ from the second reference voltage generating circuit 40 and therefore the output of the second comparison circuit 41 is converted to a low level signal. As a result, since the supply of base current to the transistor 48 through the diode 51 is stopped and the transistor 48 is turned OFF, the relay coil $9_b$ is demagnetized and contacts (c-b) of relay switch $9_a$ are reset to ON and the supply of power to the motor 8 is stopped. That is, when the predetermined time T has passed from the time where the motor 8 is being driven in the auto mode and the auto up-switch 4 is turned OFF, the power supply to motor 8 is automatically stopped and thereby generation of an irregular heating can be prevented.

(C) When the window glass is moved downward in the auto mode:

In this case, when the auto down switch 5 is turned ON, the relay coil $10_b$ is magnetized because the manual down-switch 8 is ON and the transistor 53 is ON, and, the contacts (c-a) of relay switch $10_a$ are in ON position and the motor 8 is driven as explained in (A), causing the window glass to move downward. Moreover, with charge is capacitor 21 due to the ON state of the auto down-switch 5, the voltage $V_t$ at the point Q becomes higher than the reference voltage $V_{s2}$ from the second reference voltage generating circuit 40 and therefore the second comparison circuit 41 outputs a high level signal. Therefore, a base current is supplied to transistor 53 from the bus $L_a$ through the resistor 47 and diode 56, keeping the transistor 53 in the ON state. The ON state of transistor 53 is maintained for the time T′ (=T) until the voltage $V_t$ at the point Q becomes lower than the reference voltage $V_{s2}$ because the capacitor 21 is discharged through the discharge resistor 23. During this period, since a closed loop is formed by the contacts (c-a) of relay switch $10_a$, diode $11_b$, relay coil $10_b$ transistor 53, even when the auto down-switch 5 and manual down-switch 3 are turned OFF, the power is still supplied to the motor 8 and thereby the window glass is automatically moved downward.

In the case of downward movement of the window glass, when the glass reaches the maximum downward movement position (maximum opening position of the window glass), since a comparatively large locked-rotor current flows into the motor 8, the output of the first comparison circuit 35 converts to a low level signal, as in the case of the upward movement of the window glass. Thereby, capacitor 21 is discharged through diode 25 and resistor 37, the output of the second comparison circuit 41 converts to low level signal and the transistor 53 is turned OFF. The power to the relay coil $10_b$, and moreover to the motor 8 is thereby stopped and the window glass stops at the maximum downward movement position. During such automatic downward movement of the window glass, after the auto down-switch 5 is turned OFF, the capacitor 21 is discharged. When the preset discharge time T′ of the discharge circuit of the capacitor 21 and discharge resistor 23 has passed, the voltage $V_t$ of the point Q becomes lower the reference voltage $V_{s2}$ form the second reference voltage generating circuit 40 and the output of the second comparison circuit 41 is converted to a low level signal. Accordingly, the transistor 53 turns OFF and supply of power to the motor 8 stops. Therefore, irregular continuation of the power supply to motor 8 can be prevented.

(D) When upward movement is stopped while the window glass is moving upward in the auto mode:

As is apparent from the above explanation, while the window glass is moved upward in the auto mode; the capacitor 19 is charged and thereby the transistor 48 is maintained in the ON state. When the manual down-switch 3 is turned ON for a short period under this condition, the transistor 53 turns ON, a current is supplied to the relay coil $10_b$, turning ON the contacts (c-a) of the relay switch $10_a$. Therefore, both terminals of motor 8 are disconnected through the action of the contacts (c-a) of the relay switches $9_a$, $10_a$, and the motor 8 immediately stops operation because the supply of power to the motor 8 stops. When the manual down-switch 8 is turned ON, the capacitor 19 is discharged within a short period through the diode 26, resistor 27 and transistor 53. Accordingly, the output of the second comparison circuit 41 converts to a low level signal, turning OFF the transistor 48. As a result, th relay coil $9_b$ is demagnetized and the contacts (c-b) of relay switch $9_a$ are reset to the ON state. Moreover, when the manual down-switch 3 is turned OFF after it is turned ON for a short period as explained above, the relay coil $10_b$ is demagnetized and the contacts (c-b)′ of relay switch $10_a$ are also reset to the ON state. The supply of power to motor 8 thereby stops and the motor is reset to the initial condition.

(E) When downward movement is stopped while the window glass is moving downward in the auto mode:

When the window glass is moving downward in the auto mode, the capacitor 21 is charged and thereby the transistor 53 is in the ON state. When the manual up-switch 2 is turned ON for a short period under this condition, the transistor 48 turns ON, the relay coil $9_b$ is demagnetized and the contacts (c-a) of relay switch $9_a$ are turned ON. Therefore, both terminals of motor 8 are disconnected through the action of the contacts (c-a) of the relay switches $9_a$, $10_a$. In this event, the supply of power to the motor 8 immediately stops and the motor 8 stops operating. Moreover, when the manual up-switch 2 is ON, since the capacitor 21 discharges within a short period through the diode 29, resistor 30 and transistor 48, the output of second comparison circuit 41 converts to a low level signal, turning OFF the transistor 53. As a result, the supply of power to the relay coil $10_b$ stops and the contacts (c-b) of relay switch $10_a$ are reset to the ON state. In addition, when the manual up-switch 2 is turned OFF after it is turned ON for a short period, the supply of power to the relay coil $9_b$ stops and the contacts (c-b) of relay switch $9_a$ are reset to the ON state. Thereby the motor 8 is set to the initial condition where the power is OFF.

In each case of (A)-(E) explained above, when the transistor 48 is ON, since the potential at the anode end of diode 56 connected to the base of transistor 53 drops to ground level through the diode 58 and transistor 48, if a noise element is supplied through the resistor 47 to the bus $L_a$, there is no fear of malfunction of the transistor 53. Moreover, when the transistor 53 is ON, since the potential of the anode side of diode 51 connected to the base of transistor 48 drops to ground level through the diode 59 and transistor 53, if a noise element is supplied through the resistor 45 to the bus $L_a$, there is no fear of malfunction of transistor 48.

According to the structure of the present invention, since the transistors 48 and 53 are respectively connected to the power supply through the manual up-switch 2 and manual down-switch 3, a voltage is never supplied to the transistors 48 and 53 from the DC power source terminal 6 under the steady condition where the switches 2 and 3 are in the OFF state. Therefore, there is no fear of malfunction of transistors 48 and 53 due to noise elements and, reliability of control by the control circuit 7 is improved. In addition, since the interlock circuit consisting of the diodes 51, 56, and 59 is provided, simultaneous change of transistors 48 and 53 to ON states due to malfunction resulting from noise elements applied to the bus $L_a$ can be prevented and thereby improvement in reliability of control by control circuit 7 can also be improved from this point of view.

Moreover, even if the auto-stop function (function of stopping the operation by the detection of a lock current of motor 8) for suspending the upward or downward movement of window glass fails while the window glass is being automatically moved upward or downward by the operation of auto up-switch 4 or auto down-switch 5, this operation can also be stopped after the predetermined time by the timer function of capacitor 19 or 21. Accordingly, the power is never supplied inappropriately to the motor 8 while it is in the lock condition and the motor 8 cannot be overheated and consumption of power from the vehicle battery will not increased due to operation irregularity of the auto stop function.

What is claimed is:

1. An apparatus for controlling a window regulator, comprising:

a motor for moving a window glass in any one direction of the closing and opening directions of a window depending on the direction of a current applied to said motor;

manual operation means including manual operation switch means which is turned ON by operation thereof;

auto mode operation means having auto-operation switch means which is turned ON subsequent to operation of said manual operation switch means;

a semiconductor switching element connected to a power source through said manual operation switch means and said auto-operation switch means in such a manner as to be turned ON when at least one of said manual operation switch means and said auto-operation switch means is turned ON;

a relay coil connected to the power source through said manual operation switch means and arranged so as to be energized when said semiconductor switching element is turned ON; and a relay switch arranged so as to be switched over to change the direction of a current supplied to said motor in response to energization or de-energization of said relay coil.

2. An apparatus for controlling a window regulator according to claim 1, wherein said semiconductor switching element is comprised of a transistor with the base thereof connected to the power source through said manual operation switch means and the emitter thereof grounded.

3. An apparatus for controlling a window regulator according to claim 2, wherein one end of said relay coil is connected to said manual operation switch means, while the other end thereof is connected to said manual operation switch means through a collector of said transistor.

4. An apparatus for controlling a window regulator according to claim 1, further comprising:

a charging and discharging circuit which is charged when said auto-operation switch means is turned ON and is discharged in a discharging time longer than the opening or closing time of said window glass after said auto-operation switch means is turned OFF;

a holding circuit for holding said semiconductor switching element in the ON state when the voltage and said charging and discharging circuit is higher than a predetermined value; and an auto-step circuit for stopping said motor by discharging said charging and discharging circuit within a time shorter than said discharging time when a current flowing to said motor becomes higher than a predetermined value.

5. An apparatus for controlling a window regulator according to claim 1, wherein a series circuit connecting in series a diode, the cathode of which is connected to said semiconductor switching element, and a resistor, one end of which is connected to said manual operation switch means is provided between said manual operation switch means and said semiconductor switching element.

6. An apparatus for controlling a window regulator according to claim 1, wherein a diode, the cathode of which is connected to said relay coil, and the anode to said manual operation switch means, is provided between said manual operation switch means and said relay coil.

7. An apparatus for controlling a window regulator, comprising:

a motor for moving a window glass in any one direction of the opening and closing directions depending on the direction of current supplied to said motor;

manual operation means including first and second manual operation switches which are turned ON by operation thereof;

auto mode operation means having first and second auto-operation switches which are turned ON subsequent to an operation of one of said first and second manual operation switches;

a first semiconductor switching element which is connected to a power source through said first manual operation switch and said first auto-operation switch and is turned On when at least one of said first manual operation switch and said first auto-operation switch is turned ON;

a second semiconductor switching element which is connected to a power source through said second manual operation switch and said second auto-operation switch and is turned ON when at least one of said second manual operation switch and said second auto-operation switch is turned ON;

a first relay coil which is connected to the power source through said first manual operation switch and is energized when said first semiconductor switching element is turned ON;

a second relay coil which is connected to the power source through said second manual operation switch and is energized when said second semiconductor switching element is turned ON; and a pair of relay switches which are switched over depending on energization or de-energization of said first and second relay coils to change the direction of the current supplied to said motor.

8. An apparatus for controlling a window regulator according to claim 7, wherein said first semiconductor switching element is a first transistor the base of which is connected to the power source through said first manual operation switch and the emitter to the ground, while said second semiconductor switching element is a second transistor, the base of which is connected to the power source through said second manual operation switch and the emitter to the ground.

9. An apparatus for controlling a window regulator according to claim 8, wherein one end of said first relay coil is connected to said first manual operation switch and the other end thereof is connected to said first manual operation switch through the collector of said first transistor, while one end of said second relay coils is connected to said second manual operation switch and the other end thereof is connected to said second manual operation switch through the collector of said second transistor.

10. An apparatus for controlling a window regulator according to claim 7, further comprising:

an interlock circuit for preventing said second semiconductor switching element from being turned ON due to noise when said first semiconductor switching element is ON state and also for preventing said first semiconductor switching element from being turned ON due to noise when said second semiconductor switching element is ON.

11. An apparatus for controlling a window regulator according to claim 8, further comprising:

an interlock circuit comprising a first diode connected to the cathode at the base of said first transistor, a second diode, the anode of which is connected to the anode of said first diode and the cathode of which is connected to the collector of said transistor, a third diode, the cathode of which is connected to the base of said second transistor and a fourth diode the anode of which is connected to the anode of said third diode and the cathode to the collector of said first transistor.

12. An apparatus for controlling a window regulator according to claim 7, further comprising:

a first charging and discharging circuit which is charged when said first auto-operation switch turns ON and is discharged over a discharging period longer than the opening or closing time of said window glass after said first auto-operation switch is turned OFF;

a second charging and discharging circuit which is charged when said second auto-operation switch turns ON and is discharged over a discharging period longer than the opening or closing time of said window glass after said second auto-operation switch is turned OFF;

a holding circuit for holding said first semiconductor switching element in the ON state when a voltage of said first charging and discharging circuit is higher than a predetermined value and also for holding said second semiconductor switching element in the ON state when the voltage of said second charging and discharging circuit is higher than a predetermined value; and an auto-stop circuit for stopping the motor by discharging said first and second charging and discharging circuits within a time shorter than said discharging time when a current flowing into said motor become higher than a predetermined value.

13. An apparatus for controlling a window regulator according to claim 7, wherein a series circuit connecting in series a diode, the cathode of which is connected to said first semiconductor switching element and resistor, one end of which is connected to said first manual operation switch, is provided between said first manual operation switch and said first semiconductor switching element, and a series circuit connecting in series a diode, the cathode of which is connected to said second semiconductor switching element and a resistor, one end of which is connected to said second manual operation switch is provided between said second manual operation switch and said second semiconductor switching element.

14. An apparatus for controlling a window regulator according to claim 7, wherein a diode, the cathode of which is connected to said first relay coil and the anode to said first manual operation switch, is provided between said first manual operation switch and said first relay coil, while a diode, the cathode of which is connected to said second relay coil and the anode to said second manual operation switch, is provided between said second manual operation switch and said second relay coil, 15. An apparatus for controlling a window regulator comprising:

a motor for moving a window glass in any one direction of the opening and closing directions depending on the direction of current applied;

manual operation means including a manual up operation switch and a manual down operation switch which are connected to the power source at first ends thereof, providing a normally open contact which turns ON when operated;

auto mode operation means having an auto up operation switch and an auto down operation switch, said auto up operation switch being connected to a power source at one end, and providing a resting-open contact which turns ON when operated after the manual operation switch turns ON, and said auto down operation switch being connected to said power source at one end, and providing a resting open contact which turns ON when operated after the manual down operation switch turns ON;

an up-transistor with the base thereof connected to the second end of said manual up operation switch through a first diode in the reverse direction and through a resistor, and the emitter thereof connected to the ground;

a down-transistor with the base thereof connected to the second end of said manual down operation switch through a second diode and a resistor, and the emitter thereof connected to the ground;

an up-relay coil connected to the collector of said up transistor at one end and to the second end of said manual up operation switch through a third diode in the reverse direction at the other end;

a down relay coil connected to the collector of said down transistor at one end and to the second end of said manual down operation switch through a fourth diode in the reverse direction at the other end;

an interlock circuit which is operated when said auto mode operation means is operated, and is formed by a fifth diode the cathode of which is connected to the base of said up-transistor, a sixth diode the anode of which is connected to th anode of said fifth diode and the cathode of which is connected to the collector of said down-transistor, a seventh diode the cathode of which is connected to the base of said down-transistor and an eighth diode the anode of which is connected to the anode of said seventh diode and the cathode of which is connected to the collector of said up-transistor;

an up-relay switch arranged so as to be switched by energization of said up-relay coil and to form a circuit for moving the window glass in the direction of closing; and a down-relay switch arranged so as to be switched by energization of said down-relay coil and to form a circuit for moving the window glass in the direction of opening.

16. An apparatus of controlling a window regulator according to claim 15, further comprising:

an up-capacitor capable of being charged within a short period through a first resistor when the auto up operation switch is turned ON and of being discharged in a time longer than the opening and closing time of said window glass through a second resistor after the auto up operation switch is turned OFF;

a down-capacitor capable of being charged within a short period through a third resistor when the auto down operation switch is turned ON and of being discharged in the time longer than the opening and closing time of the window through said second resistor after the auto down operation switch is turned OFF;

a holding circuit for holding said up-transistor in the ON state when a voltage of said up-capacitor is higher than a predetermined value and for holding the down-transistor in the ON state when the voltage of said down-capacitor is higher than a predetermined value;

a current detecting resistor for detecting a current flowing to said motor; and an auto stop-circuit for discharging said up-capacitor and said down-capacitor within a period shorter than said discharging time through a fourth resistor when the current flowing to said motor becomes higher than a predetermined value.

17. An apparatus for controlling a window regulator according to claim 1, further comprising:

an interlock circuit connected to said semiconductor switch element in such a manner as to be operated when said auto mode operation means is operated.

* * * * *